March 11, 1930.  M. AUSTIN  1,750,210
CORN PULP EXTRACTOR
Filed Dec. 22, 1927
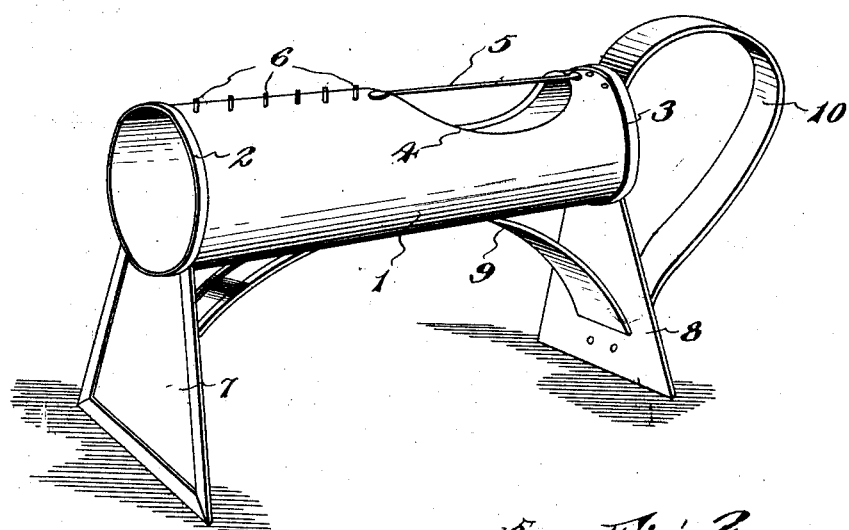
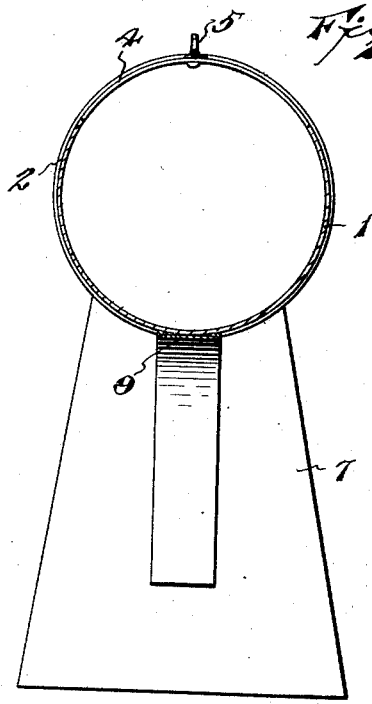
Inventor
M. Austin
By Lacey & Lacey, Attorneys Patented Mar. 11, 1930

1,750,210

UNITED STATES PATENT OFFICE

MARY AUSTIN, OF ROSEMONT, PENNSYLVANIA

CORN-PULP EXTRACTOR

Application filed December 22, 1927. Serial No. 241,903.

This invention relates to kitchen utensils and more particularly to a device by means of which pulp may be extracted from the kernels of an ear of corn for use when making corn fritters and the like.

At the present time it is customary to cut the kernels from an ear of corn and then scape the cob with a knife in order to remove pulp contained in the portions of the kernels remaining upon the cob. This has been found unsatisfactory as the initial cutting severs a portion of the outer skin of the kernels and this causes the kernels to be tough.

Therefore, one object of the invention is to provide a device by means of which the outer skins or husks of the kernels may be slit and the pulp extracted without the husks of the kernels becoming detached from the corn cob.

Another object of the invention is to provide the device with a tubular body open at its ends and carrying prongs by means of which the kernels may be slit by drawing an ear of corn longitudinally across the prongs and also carrying a presser bar against which the ear of corn may be scraped in order to express the pulp from the slit kernels.

Another object of the invention is to extend the presser bar across an opening formed in the tubular body so that the pulp scraped from the slit kernels may fall into the tubular body and either move through the body into a bowl or other receptacle placed beneath one end of it or be dumped into the bowl by tilting the body.

Another object of the invention is to provide improved means to support the body in a substantially horizontal position with its prongs and presser bar uppermost and also to provide an improved handle by means of which the body may be easily held while an ear of corn is being operated upon to remove pulp from its kernels.

The invention is illustrated in the accompanying drawing, wherein

Figure 1 is a perspective view of the improved pulp-removing device, and

Fig. 2 is a vertical sectional view through the device.

The improved corn pulp-removing device constituting the subject-matter of this invention includes a tubular body 1 which is preferably formed of sheet metal and is open at its ends. The edges of the body are rolled at its ends, as shown at 2 and 3, so that the body will be strengthened and there will be no danger of cutting the fingers when using or cleaning the device. Adjacent the rear end of the body there has been formed an opening 4 and across this opening is disposed a scraping bar 5 which extends longitudinally of the body with its ends overlapping the body and soldered or otherwise rigidly secured thereto. There have also been provided prongs 6 which project upwardly from the body and are spaced from each other longitudinally of the body between the opening 4 and the forward end of the body. It will be understood that any number of prongs may be provided and the distance between them may be varied as found desirable. These prongs 6 are to slit the kernels of an ear of corn and the bar 5 is employed to express pulp from the kernels after they have been slit. This will be explained in the operation.

In order to support the body in a substantially horizontal position as shown in Fig. 1, there has been provided supporting legs 7 and 8 which are also formed of sheet metal. These legs have their marginal portions folded inwardly, as shown in Fig. 1, so that they will be strengthened and danger of cutting the fingers elminated and have their upper ends soldered or otherwise secured to the under portion of the tubular body adjacent its ends. The legs increase in width toward their lower ends so that they have very good engagement with a table or other support upon which the device is rested. Therefore, when the device is in use, it will be well supported and not liable to tilt transversely which would prevent it from being conveniently used. In order to brace the supporting legs and prevent them from becoming bent or broken loose from the body, there has been provided a brace 9 consisting of a strip of sheet metal curved longitudinally and having its intermediate portion soldered or otherwise secured to the under surface of the body intermediate its length and having its downwardly curved end portions soldered or otherwise secured to the inner surfaces of the supporting legs. A handle 10 which is also formed from a strip of sheet metal and bent, as shown in Fig. 1, has its upper end secured to the upper portion of the body adjacent the rear end thereof and its lower end secured to the outer surface of the leg 8 near the lower end thereof. Rivets are preferably employed to secure the ends of the handle to the body and rear supporting leg, but it will be understood that they may be soldered or rigidly secured in any other manner desired.

When this device is in use, it rests upon a table or other support, as shown in Fig. 1, and is grasped by the handle so that it may be firmly held in place. A bowl or other receptacle may be placed close to the forward end so that pulp and juice will flow into the receptacle or, if so desired, the forward leg 7 or the entire device may be allowed to rest in the receptacle and thereby eliminate any danger of the pulp and juice being wasted. An ear of corn which has been previously cooked is grasped adjacent one end and is moved longitudinally of itself across the body with the prongs penetrating the kernels. As the ear of corn is moved longitudinally, the prongs which are embedded in the kernels will form slits therein and as a number of prongs are employed only a few strokes will be necessary to slit all of the kernels. After the kernels have been slit, the ear of corn is moved so that it rests upon the bar 5 and is again moved longitudinally of itself transversely across the scraping bar during which movement pressure is applied so that the scraping bar will cause the pulp to be expressed from the kernels and drop into the hollow body. This pulp, and any juice which is extracted with it, may flow through the body into the bowl or other receptacle or if it is found that the pulp and juice do not move freely through the body and tend to accumulate therein the body may be tilted after a certain amount of pulp has accumulated therein to cause the pulp to flow out of the forward end of the body and into the receptacle. It will thus be seen that with this device the pulp may be removed from the kernels and the husks or skins of the kernels will remain upon the cob. This pulp may then be used to make corn fritters or for any other purpose desired and will be free from husks which are indigestible.

Having thus described the invention, I claim:

1. A corn pulp remover comprising a tubular body having an opening formed in its annular wall, and means extending across the opening adapted to express pulp from kernels of an ear of corn when an ear having cut kernels is moved across the same in pressing engagement therewith.

2. A corn pulp remover comprising a tubular body having an opening formed in its annular walls, and a bar extending across the opening longitudinally of the body with its ends secured thereto.

3. A corn pulp remover comprising a tubular body having an opening formed therein, means to support the body in a substantially horizontal position with the opening in its upper portion, and a scraper extending across the opening formed in the body and having its ends secured to the body.

4. A corn pulp remover comprising a tubular body having an opening formed therein adjacent one end, a scraper extending across the opening longitudinally of the body and having its ends secured to the body, legs depending from the ends of said body to support the body in a substantially horizontal position with the opening in its upper portion, and a handle at one end of the body secured to the body and adjacent leg.

In testimony whereof I affix my signature.

MARY AUSTIN. [L. S.]